Jan. 1, 1963     J. B. SCANNELL     3,071,386
FLUID PRESSURE SEALS
Filed March 14, 1960

United States Patent Office 3,071,386
Patented Jan. 1, 1963

3,071,386
FLUID PRESSURE SEALS
John B. Scannell, Drexel Hill, Pa., assignor to
Greene, Tweed & Co., North Wales, Pa.
Filed Mar. 14, 1960, Ser. No. 14,899
1 Claim. (Cl. 277—177)

This invention relates to fluid pressure seals and more particularly to annular seals for preventing the flow of a fluid under pressure through a clearance between two surfaces such as the surfaces of concentric cylindrical members.

The present invention relates specifically to "squeeze-type" seals which are seals of the kind wherein a sealing action results from the deformation of a body located within the clearance between the aforesaid surfaces.

In known types of the above-mentioned seals it is conventional to employ grooves accommodating relatively soft deformable bodies in association with a rigid body which prevents extrusion of the soft body between the members for which the seal is to be provided. It is an object of the invention, however, to provide improvements whereby the use of such grooves is avoided so that substantial machining and production advantages are achieved.

It is, moreover, an object of the invention to provide an improved seal arrangement wherein extrusion of the sealing member is prevented.

It is a further object of the invention to provide a sealing arrangement wherein pressure against a sealing member is employed to prevent the extrusion thereof.

In accordance with the invention there are provided in a clearance between members a deformable body constituting a seal between these members and wedge-shaped elements in the clearance and engaged along surfaces having a directional component transverse to the clearance, the elements being operatively disposed with respect to said body for engagement by the same, the elements further being separate from each other and from said members.

In accordance with one feature of the invention, the above-noted wedge-shaped elements or equivalent means are held in position by a simple snap ring arrangement or the like. The invention also contemplates the use of other types of retainer means such as frictionally engaged members or members which are bolted or otherwise fixed in position.

According to a further feature of the invention, one of the retainer sections may be provided with a lip for wiping one or more of the members between which the seal is provided.

According to the invention, the body providing the seal can be sandwiched between one of the above-noted retainer means and a portion on one of the relatively movable members or alternatively can be sandwiched between two of the said retainer means.

Other objects and features of the invention will be found in the following detailed description of some preferred embodiments which are illustrated in the accompanying drawing in which.

The invention is particularly concerned with providing a seal for sealing a clearance between two relatively movable cylindrical parts arranged in an assembly wherein one part moves axially with respect to the other part. Furthermore, the invention is particularly concerned with arrangements wherein a seal is provided between substantially parallel surfaces although this does not limit the application of the invention.

Figure 1:
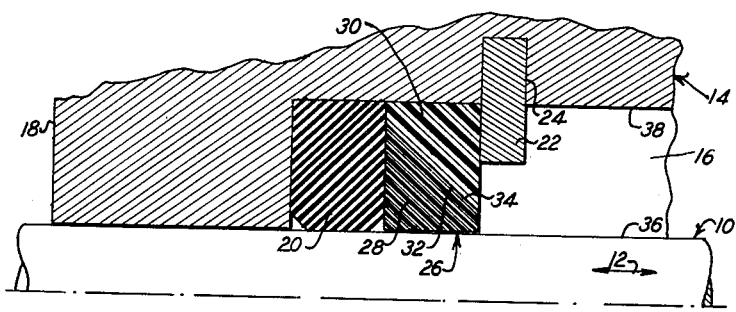
FIGURE 1 is a sectional view illustrating two relatively movable members with the clearance therebetween being provided with a seal in accordance with on embodiment of the invention.

In general, it may be observed that the relatively movable members illustrated in the drawing are cylindrical bodies constituted, for example, by a hollow cylinder through which is axially reciprocated a cylindrical rod. In FIGURE 1, for example, is illustrated a cylindrical rod 10 axially displaceable, as indicated by arrow 12, with respect to a cylindrical member 14. Between cylindrical parts 10 and 14 is located a clearance 16 which, by reason of the cylindrical shapes of members 10 and 14, is of annular configuration.

In FIGURE 1 member 14 is shown as comprising a portion 18 which is directed radially inwards towards the rod 10.

In accordance with the invention, a relatively soft and deformable body 20 is provided to constitute a seal between members 10 and 14. This body may, for example, be of rubber having a hardness of 70 to 80 Durometer on the A scale. The body may furthermore be an O ring or the like. The function of this body is to provide a seal between members 10 and 14, but it will be readily appreciated that, due to the deformable characteristics of this body, it is necessary to provide some means to hold the same in position.

According to the invention there is provided a retainer device 22 which, in this embodiment of the invention, is constituted by a simple snap ring accommodated in a simple recess or groove 24 provided in the cylindrical member 14. Between the body 20 and the retainer device 22 is provided a barrier device 26 including two separate sections 28 and 30.

Sections 28 and 30 are generally wedge-shaped; i.e., they have generally triangular cross-sections. Furthermore, sections 28 and 30 are engaged along conical cam surfaces 36 and 38 of the members 10 and 14 respectively. Stated otherwise, surfaces 32 and 34 have directional components which are transversely disposed with respect to clearance 16.

Figure 2:
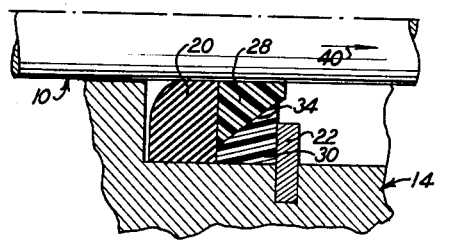
FIGURE 2 is a view similar to FIGURE 1 illustrating the operating characteristics of the structure.

Referring next to FIGURE 2, it will be seen that should fluid or gas pressure be applied against body 20 or should rod 10 move in the direction indicated by arrow 40 relative to member 14, body 20 will tend to move to the right, as viewed in the drawing. The force of body 20 acting against section 28, since section 30 is held in position by retainer ring 32, will cause member 28 to move along surface 34 of section 30 in such a manner that these sections cooperatively extend to the fullest extent between members 10 and 14. In other words, section 30 acts in the manner of a cam with member 28 acting in the nature of a cam follower, these two members cooperatively constituting barrier means preventing extrusion of the body 20 while at the same time permiting body 20 to perform its sealing function with optimum efficiency.

It will be appreciated that members 28 and 30 are annular or ring-shaped members and that the surfaces 32 and 34 thereof have the shapes of truncated cones bordered by cylindrical and radial surfaces. Since sections 28 and 30 are rings, they are preferably of a stretchable and resilient material which will permit the changes of shape indicated in FIGURES 1 and 2. These rings are nylon-like rings which may be, for example, of Teflon or nylon, which are materials which have been found to have the necessary resilience.

Figure 3:
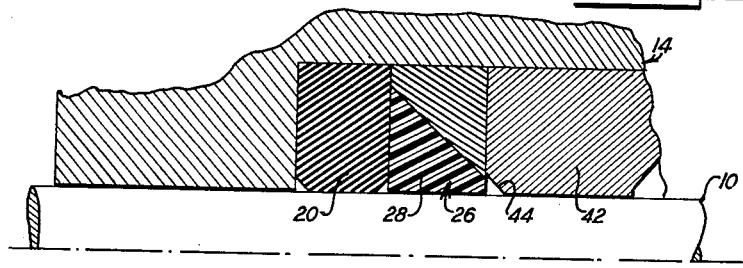
FIGURE 3 illustrates a further embodiment of the invention and in particular a variation of the retainer means.

FIGURE 3 illustrates a second embodiment of the invention wherein the snap ring 22 is replaced by a suitable substitute. This embodiment of the invention also comprises body 20 and barrier means 26, but in this instance a retainer device 42 is provided which does not require any accommodating groove or the like. Retainer means 42 can be any ring frictionally engaged in position or otherwise fixed to body 14 by means of bolts, screws, etc. The function performed by retainer device 42 is similar to that of ring 22 in FIGURE 1, but retainer device 42 has the additional production advantage that absolutely no grooves are necessary therefor.

Retainer device 42 is provided with a chamfer 44 which admits of movements of section 28 partially over barrier device 26. Thus, in effect, retainer device 22 of FIGURE 1 and retainer device 42 of FIGURE 3 extend from one member 10 or 14 towards the other of said members without extending fully across the clearance 16, at least in the zone whereat the retainer device is engaged by the associated barrier device.

Figure 4:
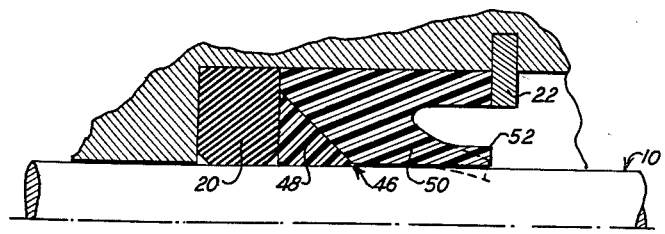
FIGURE 4 illustrates a further embodiment of the invention wherein is provided a wiper lip.

FIGURE 4 illustrates a further embodiment of the invention comprising body 20 and snap ring 22 but provided with a different type of barrier device 46.

Barrier device 46 comprises a ring 48 having a triangular cross-section and having a second section 50 provided with a resilient lip 52 adapted for wiping against rod 10 against which the lip resiliently presses.

Figure 5:
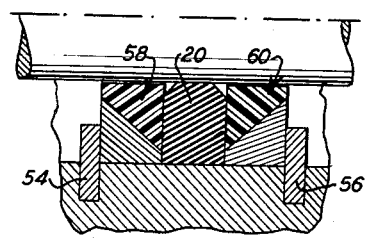
FIGURE 5 illustrates still another embodiment of the invention.

FIGURE 5 indicates that body 20 may be retained in position between two snap rings 54 and 56 or suitable substitutes, as indicated above, with barrier members 58 and 60 being interposed respectively between rings 54 and 56 and the body 20.

In the above it will be noted that there is provided, in accordance with the invention, a seal adapted for sealing a clearance between two parts having parallel surfaces. This seal comprises retainer means supported in said clearance in fixed relation to one of the surfaces and a body is provided in the clearance which is adapted to contact both surfaces to form a seal therebetween. The body is spaced from the retainer means but tends, on being subjected to pressure or upon relative movement between the surfaces, to move towards the retainer means. Barrier means are provided in the clearance between the body and retainer means, the barrier means including at least two sections slidingly engaged along surfaces inclined with respect to the relatively movable surfaces. These sections function to intercept movement of said body towards said retainer means and are caused thereby to extend fully between said surfaces to limit movement and prevent extrusion of said body.

There will now be obvious to those skilled in the art many modifications and variations of the structure set forth. These modifications and variations will not depart from the scope of the invention if defined by the following claim.

What is claimed is:

Apparatus comprising piston and cylinder parts having cylindrical surfaces spaced at a substantially constant distance to define a clearance space, retainer means supported on said cylinder part and extending into said clearance space, a soft deformable O-ring in said clearance space and in contact with both said parts to form a seal therebetween, and barrier means between and isolating said O-ring and retainer means and holding said O-ring in position, said barrier means including two closed nylon-like rings of generally triangular cross-section, one of said nylon-like rings having a cylindrical surface bearing against said cylinder part, a radial surface bearing against said retainer means and a conical cam surface sloping from a position adjacent said O-ring and cylinder part to a position remote from said O-ring and adjacent said piston part, the other of said nylon-like rings having a cylindrical surface bearing against said piston part, a radial surface facing said O-ring and a conical cam surface corresponding to and bearing against the first said cam surface, said nylon-like rings being relatively displaceable along said cam surfaces in response to fluid pressure by said O-ring to effect a radial expansion of said barrier means whereby the latter extends fully between said parts.

References Cited in the file of this patent

UNITED STATES PATENTS

| | | |
|---|---|---|
| 1,331,216 | Schneider | Feb. 17, 1920 |
| 2,462,586 | Whittingham | Feb. 22, 1949 |
| 2,739,855 | Bruning | Mar. 27, 1956 |
| 2,844,421 | Hayman | July 22, 1958 |
| 2,973,978 | Oppenheim | Mar. 7, 1961 |